United States Patent [19]

Keenan, III

[11] Patent Number: 4,836,682

[45] Date of Patent: Jun. 6, 1989

[54] METHOD AND APPARATUS FOR CALIBRATING OPTICAL SENSORS

[75] Inventor: Paul C. Keenan, III, Newark, Del.

[73] Assignee: E. I. DuPont De Nemours and Company, Wilmington, Del.

[21] Appl. No.: 881,238

[22] Filed: Jul. 2, 1986

[51] Int. Cl.[4] ............................................. G01N 21/55
[52] U.S. Cl. ...................................... 356/445; 307/311
[58] Field of Search ..................... 356/445, 73.1, 306, 356/338, 382, 389, 432, 433, 434, 435, 221, 256, 317, 323, 330, 217, 433, 226, 223, 382; 250/262, 269; 307/311; 324/411, 414, 57 PS, 78 Z

[56] References Cited

U.S. PATENT DOCUMENTS

| 4,236,826 | 12/1980 | Yamanishi | 356/223 |
| 4,557,604 | 12/1985 | Gephart | 356/432 |
| 4,622,477 | 11/1986 | Uda | 307/311 |
| 4,642,456 | 2/1987 | Watanabe | 356/443 X |
| 4,676,647 | 6/1987 | Kikkawa et al. | 356/382 |

Primary Examiner—Richard A. Rosenberger

[57] ABSTRACT

A self calibrating optical sensor is described in which a time varying response signal is provided which is a function of the reflectivity of a surface being detected and the overall response of the photodetector circuit. This response time is stored to establish a reference value to ascertain similar reflective surface are present.

8 Claims, 1 Drawing Sheet

METHOD AND APPARATUS FOR CALIBRATING OPTICAL SENSORS

FIELD OF THE INVENTION

This invention relates to optical sensors and, more particularly, to a method and apparatus for automatically calibrating such sensors.

BACKGROUND OF THE INVENTION

Numerous optical sensors are on the market today and find uses in many applications. Some of these uses include the automatic opening of doors, counting the movement of objects past a sensing point and the like. These optical sensors are usually integral packages including a light source and a light detecting transducer which generates a signal indicative of the presence or absence of an object or surface within the field of view of the transducer. The optical sensor typically generates a signal indicative of the presence or absence of an object or surface within the field of view of the transducer. The light source typically is a light-emitting diode and the transducer a phototransistor.

One of the problems which surrounds the optical sensors used today is the electrical variation that exists between different sensors. Thus, if a sensor goes bad and must be replaced, its response may be entirely different than that of the sensor that it replaces. To compensate for this variation, potentiometers have been used to vary either the light-emitting portion of the sensor or the sensitivity of the phototransistor to obtain the necessary result. This adjustment typically requires the presence of a technician thus increasing the cost and problems incumbent in the replacement of such sensors. It is far more desirable to have some means of automatically calibrating such sensors so that one sensor may be substituted for another without requiring further calibration. In this way the sensors can be replaced as simply as a light bulb in a socket.

Optical sensors are used extensively in connection with x-ray cassettes to sense whether or not an x-ray film is within the cassette or not and similarly whether or not a cassette has been doubly loaded with more than one sheet of film.

SUMMARY OF THE INVENTION

Many of the problems inherent in calibrating optical sensors are solved by the method and apparatus of this invention. According to this method, the response of an optical sensor to different backgrounds is automatically calibrated by the steps of: directing a light pulse of known time duration and having predetermined time varying intensity characteristic, that first increases and then decreases, to a reference background, sensing the time varying intensity characteristic of light from the pulse that is reflected from the reference background, measuring the time duration of the reflected light from the reference background at a predetermined intensity level to provide a reference time duration, storing the reference time duration, repeating the above steps for other backgrounds to obtain other measured time durations, and comparing the reference and other measured time durations to determine if a like other surface was measured.

The response time that is recorded is a function of the reflectivity of the surface being detected and the overall response of the photodetector circuit. Hence by the simple expedient of saving or storing this reference response time in a nonvolatile memory or similar register, the response time of other surfaces is indicative of whether the other surface is similar to the reference surface or not.

In the case of x-ray cassettes, if the response time is the same and the reference surface is that seen through the viewing window of an x-ray cassette without a film, then a shorter duration time period, indicating less reflection, is indicative of the fact the film would present. The same response time would be indicative of the face that no film is present. A still lower time interval, indicating still less reflective light, is indicative of the fact that a double film may be present.

A self calibrating apparatus for detecting such reflecting surface includes a light source for directing light to a reflecting surface, a source of energizing pulses of predetermined time duration, means coupled to the pulse source for applying an energizing pulse to the light source having a time varying amplitude increase and then decrease to provide corresponding amplitude varying light pulses, sensing means for sensing light from the light source reflected by a reflecting surface, a threshold detector coupled to the sensing means for detecting the time duration of the reflected light occurring at a preselected intensity level, means to store a first such time duration, and means to compare the stored first time duration to subsequent time durations of light from the amplitude varying light pulses reflected from other reflective surfaces at the preselected intensity level.

BRIEF DESCRIPTION OF THE DRAWINGS

This invention will best be described and understood with reference to the accompanying drawings in which.

DETAILED DESCRIPTION OF THE PREFERRED EMBODIMENT

Figure 1:
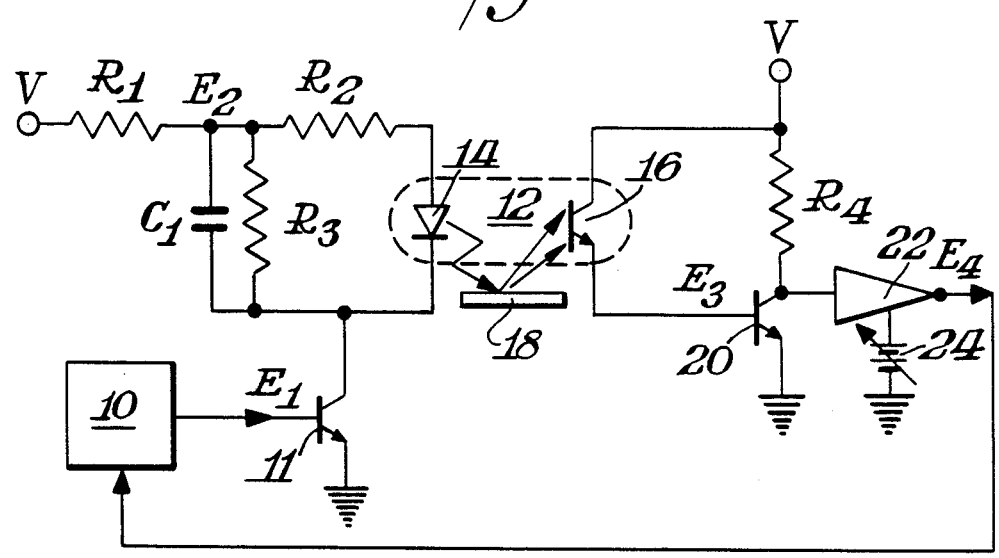
FIG. 1 is a partial block diagram of the apparatus of this invention.

Referring to FIG. 1, the preferred apparatus of this invention comprises a source of pulses of preselected time duration which is generally shown here as a digital computer 10. This computer may also serve a number of other functions in addition to those described, without detracting from the scope of this invention. Alternatively, the block 10 may be a source of pulses and a comparator for comparing the time durations of a stored reference pulse to a measuring pulse and providing a corresponding output signal. The pulse output from this pulse source 10 is coupled to the base of a switching transistor 11.

The actual optical sensor circuit comprises a voltage source V, usually about +5 volts D.C., to which may be connected through a resistor $R_1$ (10 ohms) and a parallel connected capacitor $C_1$ (4.7 μfds) and resistor $R_3$ ($10^6$ ohms) to the collector electrode of the transistor 11 whose emitter is connected to ground. Also in parallel with the capacitor $C_1$ and also connected to the collector electrode of transistor 11 is a resistor $R_2$ (220 ohms) in series with a light source such as the photoemitter (LED) portion 14 of an optical sensing means 12 such as type 703A made by TRW Corporation.

The optical sensor 12 also has a photodetector portion 16 which is connected preferably to the same voltage source. The photodetector portion 16, which may be a phototransistor having its collector connected to the voltage source V and its emitter connected to an amplifier 20 which may be simply a transistor such as a 2N222 having its emitter grounded and its collector connected through resistance $R_4$ ($10^4$ ohms) to the power source V. The photodetector output, taken from the emitter, is connected to the base of the transistor 20. The transistor 20 output, at the collector of the transistor, is connected to a threshold detector 22 such as 7404 made by Texas Instruments Inc.

The threshold detector may have an adjustable reference voltage 24 to establish the threshold level of detection. The output of the threshold detector, is a voltage signal in the form of a change in voltage when the threshold is crossed, is then directed to the pulse source and comparator 10 so that the times $T_3$ and $T_4$ that the threshold is crossed may be stored as a pulse of width $E_4$ (FIG. 2) or compared. To complete the apparatus description, the optical sensor 12 is adapted to direct light from the photoemitter 14 to a reference or test surface 18 which reflects light back to the photodetector portion 16. The intensity of the light arriving at the photodetector 16 varies as a function of the reflectivity of the surface and the overall response of the optical sensor 12.

Figure 2:
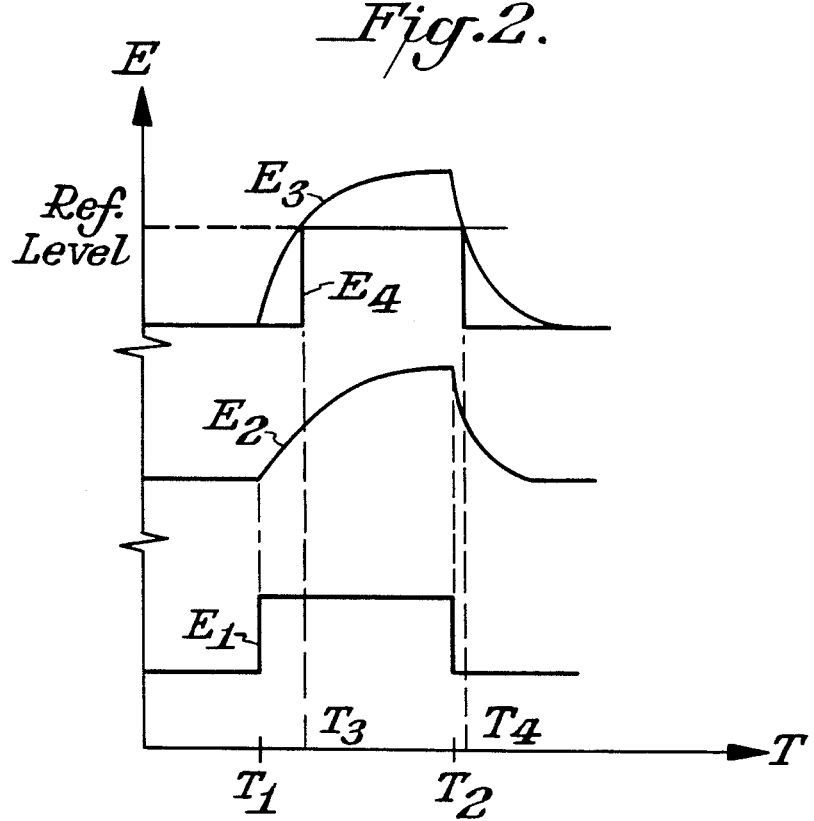
FIG. 2 are plural wave forms with voltage or light intensity as the ordinate and time as the abscissa depicting wave forms that occur at various points in the diagram of FIG. 1.

In operation, a first reference surface 18 is positioned in the field of view of the optical sensor. The surface 18, in the case of an x-ray cassette, may simulate that of the intensifying screen with or without film. If the computer is used, it may be programmed to have a calibrate mode in which a pulse $E_1$ (FIG. 2) having a time width of $T_2-T_1$ and an amplitude sufficient to trigger the switching transistor 11 is generated. The pulse is coupled to the base of the switching transistor 11 and may be one of a series of pulses of a given frequency, i.e., 50 Hz. When transistor 11 is "on", current flows through resistor $R_1$ charging capacitor $C_1$ to provide a pulse $E_2$ having an initial rising characteristic as shown in FIG. 2. At the time $T_2$, the pulse $E_1$ returns to its low value (OV), transistor 11 returns to its "off" position and capacitor $C_1$ discharges through $R_3$ and $R_2$ to provide a folding decay characteristic to complete the pulse $E_2$.

This voltage pulse $E_2$ is applied through the resistor $R_2$ to the photoemitter 14. As a result, the photoemitter 14 produces a light output whose intensity varies in proportion to the applied voltage pulse $E_2$ having the time varying rising and falling characteristics and the characteristic of the photoemitter 14. This light pulse is directed to the reference surface 18 and reflected back to the photodetector portion 16 which produces an electrical output pulse $E_3$ which also varies in proportion to the voltage $E_2$ as well as the reflectivity of the surface 18 being detected. This output pulse $E_3$ is amplified by transistor amplifier 20 and applied to the threshold detector 22 which is set an arbitrary reference detection level by the adjustable source 24. The output of this detector is a pulse $E_4$ beginning at time $T_3$ when the pulse $E_3$ crosses the reference level (FIG. 2) and ending at time $T_4$ when he pulse $E_3$ again drops below the reference level. Since the slope of the pulse $E_3$ is a function, inter alia, of the reflectivity of the surface 18, the time width of the pulse $E_4$ is dependent on the reflectivity of the calibrating surface 18 placed under the photosensing means. This time duration $T_4-T_3$ is stored in the computer for later comparison with like test surface measurements.

To ascertain if the test surfaces are similar, the computer 10 is next switched over to the normal operating mode. When a test surface 18 is in position, pulses $E_1$, of the same duration as for the calibration procedure, are sent by the computer to the switching transistor 11. The apparatus operates the same as it did in the calibrate mode with light being directed to the test surface(s) 18 and the reflected light sensed, amplified and level discriminated. The discriminator again produces a series of output pulses $E_4$ whose duration is related to the reflection characteristics of the test surface 18. These pulses are accepted as true, i.e., the test surface has the same reflectivity as the reference surface, or discarded as false, i.e., the surface has a different reflectivity than the reference surface, by comparing their duration to the stored reference pulse duration in the computer memory.

In the case of the x-ray cassette for example, if one is checking to determine if a film is in the cassette, an empty cassette is used as the reference surface. Thereafter, as successive cassettes are tested, a true signal indicates it is not, i.e., the time duration of the threshold signals from the reference and test surfaces are the same. On the other hand, a false signal indicates a film to be in the cassette which reduced the reflectivity and shortened the threshold detected time $T_4-T_3$. A time duration signal less than some low level may be used to indicate two films are in the cassette, etc.

Thus with the method and apparatus of this invention optical sensors may be replaced at will without the need for calibration. Each sensor establishes its own reference time period $T_4-T_3$ which is the basis of future comparisons. These reference time periods are characteristic of each particular sensor and hence establish a different base or reference point for each sensor automatically. The apparatus is self calibrated and hence readily adaptable for use in any system. No manual adjustment is required.

In practice either discrete or integrated components may be used. The light source may be a light emitting diode and the detector an integral or discrete phototransistor or photodiode. The means to apply the varying energy pulse to the photoemitter will be recognized as comprising substantially an integrating type R-C circuit. Alternatively and preferrably, the amplifier 20 and the comparator 22 may be a single Op-Amp chip such as the National Semi-conductor LM 10, which is an amplifier-comparator. Also the input resistor $R_1$ may be eliminated if desired. All of the above elements are well known in the art and the disclosure of specific elements and values is illustrative and not limiting.

Various replacements and modifications are also considered within the scope of this invention in which I claim:

1. A method for automatically calibrating the response of an optical sensor having a photoemitter portion and a photodetector portion and for determining the presence of different backgrounds comprising the steps of:
    (a) applying an energizing pulse to the photoemitter portion, the energizing pulse having a predetermined time duration which is substantially controlled by a time duration of a first driving pulse;
    (b) directing from the photoemitter portion to a reference background a first light pulse caused by the energizing pulse, the light pulse having a predetermined time duration substantially controlled by the time duration of the driving pulse and a predetermined time varying intensity characteristic that first gradually increases and then gradually decreases;

(c) sensing the time varying intensity characteristic of the light pulse from the reference background by the photodetector portion;

(d) measuring the time duration of the light pulse from the reference background at or above a predetermined intensity level;

(e) automatically storing the measured time duration;

(f) repeating the above steps (a) through (d) using another driving pulse having a time duration which is the same as the time duration of the first driving pulse to generate a light pulse having the same predetermined time duration and time varying intensity as the first light pulse for another background and in step (d) measuring the time duration of the light pulse from the another background at or above the same predetermined intensity level to provide another measured time duration; and (g) automatically comparing the stored time duration and the another time duration to determine if like backgrounds were measured.

2. A self calibrating apparatus for detecting the presence of a surface comprising:

a light source for directing light pulses to a surface, each of the light pulses having a predetermined time duration and a predetermined time varying intensity characteristic that first gradually increases and then gradually decreases;

a source of energizing pulses, each of the energizing pulses having a predetermined time duration and a predetermined time varying intensity characteristic that first gradually increases and then gradually decreases, the source of energizing pulses connected to the light source for energizing the light source to produce the light pulses, the source of energizing pulses responsive to driving pulses;

means coupled to the source of energizing pulses for applying the driving pulses, each of the driving pulses having a predetermined time duration, such that the time durations of the driving pulses substantially control the time durations of the energizing pulses and the time duration of the light pulses;

sensing means for sensing light pulses from the light source modulated by the surface;

a threshold detector coupled to the sensing means for detecting the time duration of the modulated light occurring at or above a preselected intensity level;

means for automatically storing a first detected time duration of the modulated light; and means for automatically comparing the stored first detected time duration to subsequent detected time durations of light from other surfaces at or above the preselected intensity level to determine the presence or absence of the other surfaces.

3. An apparatus as set forth in claim 2 wherein the light source is a light-emitting diode.

4. An apparatus as set forth in claim 2 wherein the light source and sensing means comprise a combined light emitting diode and phototransistor.

5. An apparatus as set forth in claim 2 wherein the light source includes an integrating circuit.

6. An apparatus as set forth in claim 5 wherein the integrating circuit is an R-C circuit.

7. An apparatus as set forth in claim 2 wherein the means for applying the driving pulses, storing means an comparing means comprise a digital computer.

8. An automatically self-calibrating apparatus for optically determining the presence or absence of objects comprising:

a source of energizing pulses of predetermined time duration, means coupled to the pulse source for producing pulses of light, each said light pulse having a time duration corresponding to the preselected time duration and having a time varying intensity that first increases then decreases;

means for receiving light from the producing means affected by an object to be measured and for providing an output which varies in proportion to the intensity of the affected light received by the receiving means;

means connected to the receiving means for detecting the time duration of the affected light pulses at or above a preselected intensity level;

automatic means connected to the detecting means for storing the time duration of a first one of the affected light pulses and comparing the one stored time duration to subsequent time durations of the affected light pulses to determine if a like other object was present.

* * * * *